United States Patent
Kim et al.

(10) Patent No.: US 9,643,851 B2
(45) Date of Patent: May 9, 2017

(54) METHOD FOR PRODUCING TRICHLOROSILANE

(71) Applicant: LG CHEM, LTD., Seoul (KR)

(72) Inventors: YooSeok Kim, Daejeon (KR); JeongKyu Kim, Daejeon (KR); JinHyoung Yoo, Daejeon (KR); JungWoo Lee, Daejeon (KR); Eunsu Jang, Daejeon (KR)

(73) Assignee: LG CHEM, LTD., Seoul (KR)

(*) Notice: Subject to any disclaimer, the term of this patent is extended or adjusted under 35 U.S.C. 154(b) by 52 days.

(21) Appl. No.: 14/648,478

(22) PCT Filed: Sep. 30, 2014

(86) PCT No.: PCT/KR2014/009226
§ 371 (c)(1),
(2) Date: May 29, 2015

(87) PCT Pub. No.: WO2015/047043
PCT Pub. Date: Apr. 2, 2015

(65) Prior Publication Data
US 2015/0344314 A1 Dec. 3, 2015

(30) Foreign Application Priority Data
Sep. 30, 2013 (KR) .......... 10-2013-0116951
Sep. 30, 2014 (KR) .......... 10-2014-0131843

(51) Int. Cl.
C01B 33/107 (2006.01)
B01J 8/20 (2006.01)
C01B 33/021 (2006.01)
B01J 8/00 (2006.01)
B01J 19/24 (2006.01)

(52) U.S. Cl.
CPC ....... *C01B 33/10763* (2013.01); *B01J 8/0015* (2013.01); *B01J 8/20* (2013.01); *B01J 19/2415* (2013.01); *C01B 33/021* (2013.01); *B01J 2219/00051* (2013.01); *B01J 2219/24* (2013.01)

(58) Field of Classification Search
CPC ....... B01J 8/20; B01J 8/22; B01J 8/085; B01J 8/087; B01J 8/1836; B01J 8/1872; B01J 8/0015; B01J 19/2415; B01J 2219/00051; C01B 33/10736; C01B 33/10768; C01B 33/10773
See application file for complete search history.

(56) References Cited

U.S. PATENT DOCUMENTS 5,118,486 A * 6/1992 Burgie .............. C01B 33/02
423/342
9,321,653 B2 4/2016 Akiyoshi et al.
(Continued)

FOREIGN PATENT DOCUMENTS

CN 101445204 A 6/2009
DE 102009037155 B3 11/2010
(Continued)

*Primary Examiner* — Lessanework Seifu
(74) *Attorney, Agent, or Firm* — Dentons US LLP

(57) ABSTRACT

The present invention relates to a method for producing trichlorosilane. The method includes dispersing metal silicon particles in liquid silane-based compounds containing tetrachlorosilane and optionally reacting the metal silicon particles with hydrogen chloride in the presence of hydrogen gas.

4 Claims, 1 Drawing Sheet

(56) References Cited

U.S. PATENT DOCUMENTS

2009/0142246 A1    6/2009  Masuda et al.
2012/0189526 A1    7/2012  Petrik et al.
2013/0078176 A1    3/2013  Stochniol et al.

FOREIGN PATENT DOCUMENTS

| JP | 56073617 | 6/1981 |
|---|---|---|
| JP | 1988-095107 A | 4/1988 |
| JP | 1988-095108 A | 4/1988 |
| JP | 1988-095109 A | 4/1988 |
| JP | 1988-095110 A | 4/1988 |
| JP | 1989-313314 A | 12/1989 |
| JP | 1989-313315 A | 12/1989 |
| JP | 1989-313316 A | 12/1989 |
| JP | 1989-313317 A | 12/1989 |
| JP | 1989-313318 A | 12/1989 |
| JP | 3324922 | 7/2002 |
| JP | 2011-168443 A | 9/2011 |
| JP | 2013-517207 A | 5/2013 |
| KR | 1020110133419 | 12/2011 |
| KR | 1020120013071 | 2/2012 |
| KR | 1020120125470 | 11/2012 |
| KR | 1020130097182 | 9/2013 |
| KR | 1020130105160 | 9/2013 |

\* cited by examiner

METHOD FOR PRODUCING TRICHLOROSILANE

This application is a National Stage Application of International Application No. PCT/KR2014/009226, filed Sep. 30, 2014, and claims the benefit of Korean Application No. 10-2013-0116951, filed Sep. 30, 2013 and Korean Application No. 10-2014-0131843, filed Sep. 30, 2014, all of which are hereby incorporated by reference in their entirety for all purposes as if fully set forth herein.

BACKGROUND OF THE INVENTION

1. Field of the Invention

The present invention relates to a method for producing trichlorosilane, and more specifically to a method for producing trichlorosilane from tetrachlorosilane in a more efficient manner.

2. Description of the Related Art

Trichlorosilane ($SiHCl_3$: TCS) is a compound useful as a raw material for the production of highly pure polycrystalline silicon (also called polysilicon). Trichlorosilane reacts with hydrogen at a temperature of 1000° C. or higher to deposit high purity polysilicon. This deposition is mainly represented by the following reactions:

$$4SiHCl_3 \rightarrow Si + 3SiCl_4 + 2H_2 \quad (1)$$

$$SiHCl_3 + H_2 \rightarrow Si + 3HCl \quad (2)$$

Trichlorosilane used for the deposition of polysilicon is generally produced by the reaction of metal silicon and hydrogen chloride. For example, Japanese Patent No. 3324922 discloses a method for producing trichlorosilane by reacting metal silicon with hydrogen chloride in the presence of a catalyst containing iron and aluminum in a fluidized bed reactor, as depicted in Reaction 3:

$$Si + 3HCl \rightarrow SiHCl_3 + H_2 \quad (3)$$

According to the method, gases formed as a result of the reaction of the metal silicon and the hydrogen chloride are cooled to −10° C. or below, followed by condensation. The condensate includes other chlorosilanes as well as trichlorosilane. The trichlorosilane is isolated and collected from the condensate by distillation. The trichlorosilane is used as a raw material for the production of polysilicon. Tetrachlorosilane ($SiCl_4$: STC) isolated by distillation is converted to trichlorosilane (TCS), as depicted in Reaction 4:

$$3SiCl_4 + 2H_2 + Si \rightarrow 4SiHCl_3 \quad (4)$$

That is, the tetrachlorosilane is reused for the production of polysilicon.

On the other hand, Japanese Patent Publication No. Sho 56-73617 suggests another method for producing trichlorosilane. According to the method, metal silicon particles having a size of about 100 to about 300 μm, hydrogen chloride, tetrachlorosilane, and hydrogen are supplied to a fluidized bed reactor filled with metal silicon particles. In the reaction vessel, the metal silicon reacts with the hydrogen chloride to form trichlorosilane (Reaction 3), and simultaneously, the metal silicon, the tetrachlorosilane, and the hydrogen react with each other to form trichlorosilane (Reaction 4). This fluidized bed process is illustrated in FIG. 1. As the reactions proceed, the metal silicon particles are gradually reduced in size, which requires the replenishment of fresh metal silicon particles. Since a change in the temperature of the raw materials is monitored to determine when to replenish the fresh metal silicon particles, the reaction temperature is not constant and fluctuates, and as a result, the quality of the product becomes non-uniform depending on the reaction time.

Under these circumstances, there is a need for a method by which chlorosilanes, particularly tetrachlorosilane, present in gases released during the production of polysilicon from trichlorosilane can be more efficiently converted to trichlorosilane and can thus be reused for the production of polysilicon.

SUMMARY OF THE INVENTION

The present invention is intended to provide a method for conversion of chlorosilanes, particularly tetrachlorosilane, which are present in gases released during the production of polysilicon from trichlorosilane, to trichlorosilane in a more efficient manner.

The present invention is also intended to provide an apparatus for implementing the trichlorosilane production method.

According to one aspect of the present invention, a method for producing trichlorosilane is provided which includes dispersing metal silicon particles in liquid silane-based compounds, including tetrachlorosilane, and optionally reacting the metal silicon particles with hydrogen chloride in the presence of hydrogen gas.

The reaction is preferably carried out in a liquid phase in a tubular reactor.

The reaction may be carried out at a temperature of about 300° C. to about 1000° C.

The reaction may be carried out at a pressure of about 50 bar to about 300 bar.

Preferably, the metal silicon particles have a weight average diameter of about 30 microns or less.

The metal silicon particles and the liquid silane-based compounds may be in a weight ratio of about 1:20 to about 1:200.

The liquid silane-based compounds may be by-products in the deposition of polysilicon by thermal decomposition of trichlorosilane.

The hydrogen and the tetrachlorosilane may be in a weight ratio of 1:20 to 1:200.

The hydrogen chloride and the tetrachlorosilane may be in a weight ratio of 1:0 to 1:10.

According to one embodiment, the method may further include a step of separating silicon particles remaining in the products after the reaction.

According to an alternative embodiment, the metal silicon particles may be used up in the reaction, leaving no residue in the products after the reaction.

Trichlorosilane produced by the method may be used for the deposition of polysilicon by thermal decomposition.

According to another aspect of the present invention, an apparatus provided for producing trichlorosilane includes: means for supplying silane-based compounds, including liquid tetrachlorosilane; optionally means for supplying hydrogen chloride; a unit for mixing the silane-based compounds and optionally the hydrogen chloride supplied from the respective means to prepare a liquid mixture; means for supplying metal silicon particles to the liquid mixture and dispersing the metal silicon particles in the liquid mixture; a tubular reactor equipped with heating means, to which the dispersion of the metal silicon particles in the liquid mixture is supplied; means for supplying hydrogen gas to the reactor; and means for collecting trichlorosilane from products discharged from the tubular reactor.

According to one embodiment, the metal silicon particles may be dispersed in liquid silane-based compounds before supply.

The apparatus may further include a raw material storage tank equipped with an agitator, where the dispersion of the metal silicon particles in the liquid mixture is stored.

According to one embodiment, the dispersion of the metal silicon particles in the liquid mixture is supplied to the tubular reactor at such a linear velocity that the metal silicon particles are prevented from being precipitated.

According to the present invention, metal silicon particles are dispersed in and react with a mixture of liquid tetrachlorosilane and hydrogen chloride. This liquid phase reaction allows for homogenization of the reaction mixture, ensuring high contact efficiency. As a result, high productivity of trichlorosilane can be obtained. In addition, the use of a microtubular reactor instead of a fluidized bed reactor facilitates heat control, contributing to improvements in the quality and productivity of the product while minimizing the occurrence of side reactions.

DETAILED DESCRIPTION OF THE INVENTION

Figure 1:
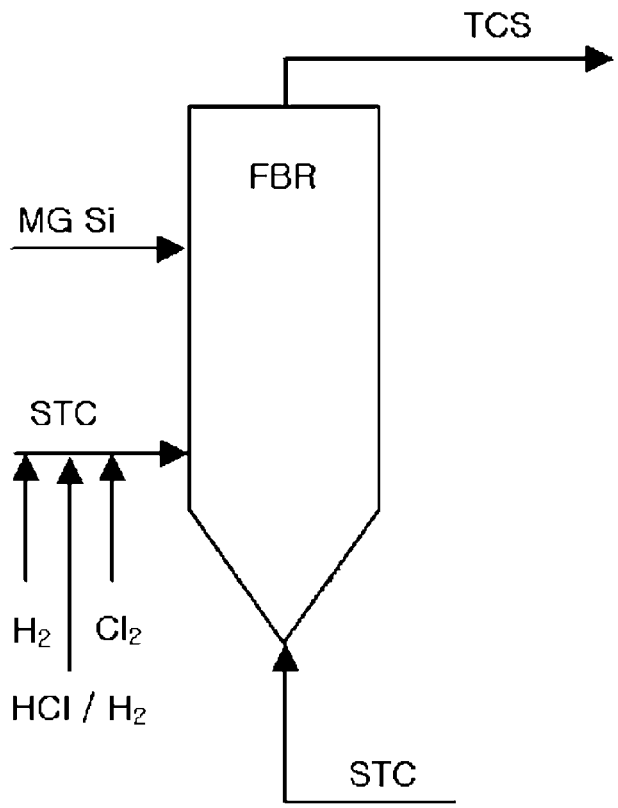
FIG. 1 is a schematic diagram illustrating a fluidized bed process according to the prior art.

As the present invention allows for various changes and numerous embodiments, particular embodiments will be illustrated in drawings and described in detail in written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, detailed explanations of related art are omitted when it is deemed that they may unnecessarily obscure the essence of the present invention.

The present invention provides a method for producing trichlorosilane, comprising dispersing metal silicon particles in liquid silane-based compounds containing tetrachlorosilane and optionally reacting the metal silicon particles with hydrogen chloride in the presence of hydrogen gas.

According to the method of the present invention, the reaction of the metal silicon and the hydrogen chloride (Reaction 3) and the reaction of the tetrachlorosilane, the metal silicon, and hydrogen (Reaction 4) proceed simultaneously to form trichlorosilane. The overall reaction is carried out in a liquid phase and can be represented by Reaction 5:

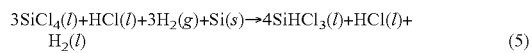

$$3SiCl_4(l)+HCl(l)+3H_2(g)+Si(s) \rightarrow 4SiHCl_3(l)+HCl(l)+H_2(l) \quad (5)$$

The reaction products exist in the form of liquids due to the internal pressure of a reactor immediately after the reaction.

Below is a more detailed discussion of the individual reactants.

Tetrachlorosilane

The tetrachlorosilane is used without particular limitation in the reaction. For example, the tetrachlorosilane may be a by-product in the production of polysilicon from trichlorosilane. This ensures effective use of the tetrachlorosilane.

Metal Silicon Particles

By adjusting the size of the metal silicon particles to 35 microns or less the contact area between the tetrachlorosilane and the silicon particles increases, which results in an increase of the number of reactive sites. As a result, the reaction rate increases, which brings about an increase in the productivity of trichlorosilane. In addition, the metal silicon particles become smaller in size and may thus be used up after the lapse of a predetermined reaction time.

The method of the present invention allows uniform dispersion of the metal silicon particles in the liquid tetrachlorosilane to prevent aggregation and precipitation of the metal silicon particles. The use of the metal silicon particles is advantageous in increasing the contact area with the tetrachlorosilane.

The metal silicon is metallurgical metal silicon or a particulate solid material including silicon element in the form of a metal such as ferrosilicon or polysilicon. There is no particular restriction on the kinds and contents of impurities (e.g., iron compounds) in the metal silicon. The metal silicon particles or powder used herein is intended to include metal silicon particles having a weight average particle diameter not larger than about 35 microns. The average particle diameter of the metal silicon may be not larger than about 30 microns, about 25 microns, about 10 microns or about 5 microns and at least about 0.1 microns or about 0.5 microns.

About 200 parts by weight or less or about 150 parts by weight or less, or at least about 20 parts by weight or at least about 50 parts by weight of the tetrachlorosilane may be mixed with 1 part by weight of the metal silicon particles.

The amount of the metal silicon particles may be suitably selected in a range such that the metal silicon particles dispersed in the tetrachlorosilane are spaced about 1000 nm or less or about 500 nm or less and at least about 10 nm or at least about 50 nm apart from each other.

Preferably, the metal silicon particles are used up in the reaction, leaving no residue. Therefore, the method of the present invention eliminates the need for a process of separating the residual amount of the metal silicon from the products after the reaction.

Hydrogen Chloride

The hydrogen chloride optionally reacts with the metal silicon. The kind of impurities in the hydrogen chloride is not particularly limited. For example, hydrogen may be incorporated into the hydrogen chloride. However, since the highly hydrolysable chlorosilanes such as trichlorosilane, tetrachlorosilane, and dichlorosilane have a strong tendency to react with water, the presence of water in the hydrogen chloride may increase the risk of low trichlorosilane yield. For this reason, it is preferred that the hydrogen chloride is in a dry state. The hydrogen chloride is dispersed at a molecular level and it can thus be sufficiently distributed around the silicon nanoparticles dispersed in the liquid reactants, resulting in high reaction efficiency.

The hydrogen chloride and the tetrachlorosilane may be in a weight ratio of 1:0-10, preferably 1:0-5.

There is no limitation on the amount of the hydrogen chloride. For example, the hydrogen chloride may be used in an amount not larger than about 1 mole, about 0.8 moles or about 0.5 moles and at least about 0.1 moles or about 0.2 moles, based on about 1 mole of the tetrachlorosilane. The amount of the hydrogen chloride may be set within a proper range depending on the type and size of a reactor, together with the individual supply rates of the reactants.

Reactor

The use of a tubular reactor, particularly a microtubular reactor, is preferred in a liquid phase reaction. Preferably, the microtubular reactor has an inner diameter of about 10 mm or less or about 1 mm or more and a length of about 500 cm or less or about 10 cm or more. Within these ranges, uniform dispersion and a sufficient retention time of the reactants can be ensured. The diameter-to-length ratio of the microtubular reactor is preferably 1:10-5000, more preferably 1:20-500.

The reaction temperature may be appropriately determined taking into consideration the material and capacity of a production apparatus. However, if the reaction temperature is higher than is necessary, the selectivity for trichlorosilane deteriorates and the amounts of chlorosilane by-products (e.g., tetrachlorosilane and dichlorosilane) other than trichlorosilane increase. The direct chlorination of silicon (Si+3HCl→SiHCl$_3$+H$_2$) is an exothermic reaction. The reaction of tetrachlorosilane with hydrogen to generate trichlorosilane in the same reactor is an endothermic reaction. Taking the conditions of the two reactions into consideration, the reaction temperature may be appropriately set. The reaction temperature is typically set to 1000° C. or less, preferably 800° C. or less, 600° C. or less or 400° C. or less and at least 200° C. or at least 300° C., but is not limited thereto.

The selectivity for trichlorosilane and the reactivity of the tetrachlorosilane increase with increasing pressure of the reactor. Appropriate control over the pressure of the reactor is thus required. The pressure is typically set to about 100 bar or less or about 50 bar or less. However, the pressure is set to about 50 bar or higher or about 300 bar or less in order to keep the reaction in a liquid phase.

Hydrogen

In the method of the present invention, the hydrogen reacts with the tetrachlorosilane to assist in forming trichlorosilane. The hydrogen is available from various industrial sources. For example, hydrogen released during the production of polysilicon may be appropriately purified before use.

The weight ratio of the hydrogen to the tetrachlorosilane may be 1:20-200, preferably 1:50-100.

The amount of the hydrogen may be not larger than 5 moles, 4 moles or 3 moles and at least 1 mole, based on 1 mole of the tetrachlorosilane, but is not limited thereto. The supply rate of the hydrogen may be set within an appropriate range depending on the type and size of the reactor.

Reaction Catalyst

In the method of the present invention, a catalyst may also be used to improve the efficiency of the reaction but its use is not necessarily required. The reaction may be efficiently carried out even in the absence of a catalyst.

Any catalyst known as a catalytic component for the reaction between the metal silicon and the hydrogen chloride may be used without limitation. Specific examples of such catalytic components include: Group VIII metals such as iron, cobalt, nickel, palladium, and platinum, and their chlorides; and other metals, such as aluminum, copper, and titanium, and their chlorides. These catalysts may be used alone or in combination thereof. The catalytic component may be used in an amount sufficient to improve the production of the trichlorosilane with high efficiency. The amount of the catalytic component is not particularly limited and may be appropriately determined taking into consideration various factors, such as the capacity of a production apparatus.

The catalytic component may be directly added to the reaction system. Alternatively, the catalytic component (e.g., an iron compound) may be present as an impurity in the metal silicon. In this case, the impurity can be effectively used as the catalytic component. Even when the catalytic component is contained as an impurity in the metal silicon, another catalytic component may be further added to the reaction system to increase the reactivity between the metal silicon and the hydrogen chloride without causing any problem.

Polysilicon Production

According to the method of the present invention, trichlorosilane is produced from the tetrachlorosilane. The trichlorosilane can be used as a raw material for the production of highly pure polycrystalline silicon (also called polysilicon). The trichlorosilane may be thermally decomposed at a temperature of 1000° C. or higher to deposit polysilicon, as depicted in the following reactions:

$$4SiHCl_3 \rightarrow Si+3SiCl_4+2H_2 \quad (1)$$

$$SiHCl_3+H_2 \rightarrow Si+3HCl \quad (2)$$

Preferably, the thermal decomposition is performed in the presence of hydrogen.

The deposition of polysilicon using trichlorosilane is widely known in the art and detailed explanations of the process conditions are thus omitted.

Hereinafter, one embodiment of the method according to the present invention will be explained in more detail with reference to FIG. 2.

The present invention also provides an apparatus for producing trichlorosilane, including: means for supplying silane-based compounds, including liquid tetrachlorosilane; optionally means for supplying hydrogen chloride; a unit for mixing the silane-based compounds and optionally the hydrogen chloride supplied from the respective means to prepare a liquid mixture; means for supplying metal silicon particles to the liquid mixture and dispersing the metal silicon particles in the liquid mixture; a tubular reactor equipped with heating means, to which the dispersion of the metal silicon particles in the liquid mixture is supplied; means for supplying hydrogen gas to the reactor; and means for collecting trichlorosilane from products discharged from the tubular reactor.

More detailed explanation will be described below. The flow rate of hydrogen gas from the corresponding supply means may be controlled using a mass flow controller (MFC). The hydrogen gas released by the pressure of a hydrogen cylinder is supplied to the reactor through the MFC, where the flow rate of the hydrogen gas is controlled.

In the hydrogen chloride supply means, the flow rate of the hydrogen chloride can be controlled using an MFC. The hydrogen chloride released by the pressure of a hydrogen chloride cylinder is dissolved in a tetrachlorosilane solution and, together with the tetrachlorosilane solution, is supplied to the reactor.

According to one embodiment, the tetrachlorosilane solution of the hydrogen chloride may be stored in a raw material storage tank.

The raw material storage tank is double-jacketed such that it is maintained at a temperature not higher than 10° C. taking the boiling point of the raw material into consideration. The temperature of the raw material storage tank is preferably maintained low by a cooler.

The unit for adding a silicon powder is mounted on top of the tank. The silicon powder is fed into the tank where it can be dispersed in the tetrachlorosilane solution.

The tank may have a space defined by partition walls to prevent external air from entering into the vessel. The space is connected to a vacuum pump and prevents the permeation of external oxygen and water when the silicon powder is fed into the tank.

An agitator is preferably mounted in the raw material storage tank to keep the silicon particles in a uniform dispersion state. The agitator is rotated at a rate of about 50 rpm to about 500 rpm and inhibits the precipitation of the silicon particles.

The raw material storage tank may be provided in plurality. When two raw material storage tanks are provided, they are connected to each other through a pipe. In this case, when the raw materials stored in the first tank are used up, the raw materials stored in the second tank are continuously fed into the reactor.

The mixture including the silicon particles dispersed therein is continuously fed from the raw material storage tank into the tubular reactor by the action of a liquid transfer pump. The discharge pressure of the liquid transfer pump is preferably about 100 bar or higher, more preferably about 200 bar or higher. A pump of a particular type (a high-pressure pump) is proper as the liquid transfer because the silicon powder in the form of a solid should be transferred together with the solution and the reactivity of the tetrachlorosilane solution with water and oxygen should be taken into account.

The raw materials fed into the tubular reactor by the action of the high-pressure pump react while passing through the tubular reactor under high temperature, high pressure conditions. The reaction temperature of the tubular reactor is typically from about 200° C. to about 400° C., more preferably from about 250° C. to about 350° C.

After completion of the reaction, the reaction products are in their liquid states while passing through a downstream portion of the tubular reactor, which has been previously cooled to 10° C. or less, and are collected in a capture unit. Unreacted hydrogen gas, unreacted hydrogen chloride gas, and chlorine gas are separated from the liquid by the capture unit and the liquid is transferred to a storage container through a transfer unit.

Figure 2:
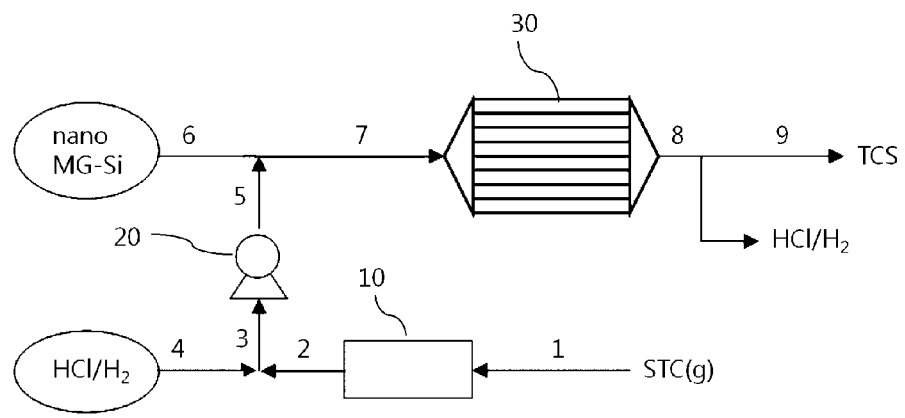
FIG. 2 is a schematic flow diagram illustrating a method for producing trichlorosilane according to the present invention.

FIG. 2 schematically illustrates the constitution of an apparatus according to one embodiment of the present invention.

As illustrated in FIG. 2, tetrachlorosilane gas 1 passes through a cooler 10 and is converted to liquid tetrachlorosilane 2. Hydrogen chloride 4 is blended with and dissolved in the liquid tetrachlorosilane 2. Metal silicon particles 6 are fed to and blended with the tetrachlorosilane solution. If needed, the tetrachlorosilane solution may be pressurized by the action of a pump 20 before blended with the metal silicon particles. The pressurization of the tetrachlorosilane solution is not necessarily required.

Hydrogen gas may be added in any of the above-described stages. For example, the hydrogen gas may be added before or after blending of the metal silicon particles with the liquid tetrachlorosilane 2 or before or after dispersion of the metal silicon particles.

The liquid tetrachlorosilane/hydrogen chloride mixture solution 7 including the metal silicon particles dispersed therein is fed into a tubular reactor 30 where the raw materials are allowed to react. Although not illustrated, the mixture solution may be stored in a raw material storage tank equipped with an agitator, as explained earlier. The reactor 30 is equipped with heating means (not illustrated) adapted to provide an optimum reaction temperature. The reactor 30 may be designed to provide a sufficient retention time and a large contact area.

The silicon particles densely dispersed in the tetrachlorosilane are precipitated. Accordingly, the linear velocity of the silane solution including the silicon dispersed therein when passing through the tubular reactor should be higher than the rate of precipitation of the silicon. For example, when 10 μm silicon particles are precipitated at a rate of about 10 mm/second in the tetrachlorosilane solution, the linear velocity of the silane solution should be equal to or greater than at least 10 mm/second in order for the solution to pass through the tubular reactor having a 10 mm inner diameter without being precipitated. Consequently, the length and inner diameter of the tubular reactor may be determined depending on the size and precipitation rate of the silicon powder.

According to a preferred embodiment, the metal silicon particles are used up in the reaction, eliminating the need for a process (e.g., a filtering process) of separating the metal silicon particles remaining after the reaction.

An effluent 8 discharged from the reactor 30 exists in the form of a liquid due to the internal pressure of the reactor. Trichlorosilane and hydrogen chloride/hydrogen may be separated from the liquid reaction products by distillation under positive or negative pressure. Alternatively, taking advantage of the fact that trichlorosilane is a liquid and hydrogen chloride and hydrogen are gases at room temperature, the trichlorosilane, the hydrogen chloride, and the hydrogen existing in liquid states immediately after the reaction are stored in a state in which the pressure is removed, and as a result, the liquid trichlorosilane can be easily obtained.

According to the method of the present invention, liquid tetrachlorosilane is used to carry out the reaction in a liquid phase in a tubular reactor, where metal silicon particles are allowed to react. Accordingly, the reactants can be homogenized, the reactive surface area increases, and the reaction temperature is easy to control, achieving maximum production efficiency.

The present invention will be explained in detail with reference to the following examples. These examples are merely illustrative and the scope of the invention is not limited thereto.

EXAMPLE 1

1 wt % of metal silicon (purity=98%, average particle diameter=3 μm) was dispersed in tetrachlorosilane. The dispersion, hydrogen chloride, and hydrogen were introduced into a microtubular reactor at flow rates shown in Table 1, and the reaction was allowed to proceed while maintaining a reaction temperature of 350° C. and an internal pressure of 160 bar. The microtubular reactor consisted of four SUS316 reaction tubes connected to each other. The inner diameter and length of each reaction tube were 4 mm and 300 mm, respectively.

TABLE 1

| Example No. | Flow rates of raw materials (g/min) | | | | Compositions of products (mole %) | | | Residual amount of metal silicon (g) |
|---|---|---|---|---|---|---|---|---|
| | STC | HCl | $H_2$ | Si | TCS | STC | HCl | |
| 1-1 | 14.9 | 0.15 | 0.1 | 0.15 | 16 | 47 | 37 | 0.045 |
| 1-2 | 11.2 | 0.15 | 0.1 | 0.15 | 6 | 78 | 16 | 0.121 |
| 1-3 | 14.9 | 0.15 | 0.1 | 0.3 | 21 | 41 | 38 | 0.276 |
| 1-4 | 14.9 | 0 | 0.1 | 0.15 | 5 | 81 | 14 | 0.086 |

EXAMPLE 2

The reaction was carried out in the same manner as in Example 1-1, except that the reaction temperature was changed to 260° C. The content of TCS in the products was 7 mole %.

EXAMPLE 3

The reaction was carried out in the same manner as in Example 1-1, except that the reaction pressure was changed to 120 bar. The content of TCS in the products was 14 mole %.

COMPARATIVE EXAMPLE 1

The reaction temperature was changed to 350° C. and the internal pressure of the reactor was changed to 10 kg/cm$^2$G. As a result, all reactants, including STC, were vaporized, making it impossible to carry out the reaction in a continuous manner.

[Explanation of Reference Numerals]
- 10 Cooler
- 20 Pump
- 30 Tubular reactor As is apparent from the foregoing, metal silicon particles are dispersed in and react with a mixture of liquid tetrachlorosilane and hydrogen chloride. This liquid phase reaction allows for homogenization of the reaction mixture, ensuring high contact efficiency. As a result, high productivity of trichlorosilane can be obtained. In addition, the use of a microtubular reactor instead of a fluidized bed reactor facilitates heat control, contributing to improvements in the quality and productivity of the product while minimizing the occurrence of side reactions.

What is claimed is:

1. An apparatus for producing trichlorosilane, comprising:
   - means for supplying silane-based compounds, comprising liquid tetrachlorosilane;
   - optionally means for supplying hydrogen chloride;
   - a unit for mixing the silane-based compounds and optionally the hydrogen chloride supplied from the respective means to prepare a liquid mixture;
   - means for supplying metal silicon particles to the liquid mixture and dispersing the metal silicon particles in the liquid mixture;
   - a tubular reactor equipped with heating means, to which the dispersion of the metal silicon particles in the liquid mixture is supplied;
   - means for supplying hydrogen gas to the reactor; and
   - means for collecting trichlorosilane from products discharged from the tubular reactor.

2. The apparatus according to claim 1, wherein the metal silicon particles are dispersed in liquid silane-based compounds before supply.

3. The apparatus according to claim 1, further comprising a raw material storage tank equipped with an agitator, where the dispersion of the metal silicon particles in the liquid mixture is stored.

4. The apparatus according to claim 1, wherein the dispersion of the metal silicon particles in the liquid mixture is supplied to the tubular reactor at such a linear velocity that the metal silicon particles are prevented from being precipitated.

* * * * *